United States Patent [19]

Fukushima et al.

[11] Patent Number: 5,161,143
[45] Date of Patent: Nov. 3, 1992

[54] INFORMATION RECORDING-REPRODUCING APPARATUS FOR OPTIMIZING DATA TRANSFER

[75] Inventors: Yoshihisa Fukushima, Osaka; Isao Satoh, Neyagawa; Yuji Takagi, Hirakata; Yasushi Azumatani, Neyagawa; Hiroshi Hamasaka, Nishinomiya, all of Japan

[73] Assignee: Matsushita Electric Industrial Co., Ltd., Kadoma, Japan

[21] Appl. No.: 650,782

[22] Filed: Feb. 5, 1991

[30] Foreign Application Priority Data

Feb. 6, 1990 [JP] Japan .................................. 2-26495

[51] Int. Cl.⁵ ................................................ G11B 7/00
[52] U.S. Cl. ........................................ 369/53; 369/48; 369/32; 364/929; 379/88
[58] Field of Search .................... 369/53; 364/900, 423, 364/440, 514, 517, 524, 582, 929, 238.5; 379/132, 144, 89, 88, 100; 360/22, 32, 106; 309/48–50, 53, 54, 58, 32

[56] References Cited

U.S. PATENT DOCUMENTS 4,890,317 12/1989 Hird et al. ............................ 379/132

Primary Examiner—Roy N. Envall, Jr.
Assistant Examiner—Muhammad Edun
Attorney, Agent, or Firm—Cushman, Darby & Cushman

[57] ABSTRACT

An information recording-reproducing apparatus for optimizing data transfer between a host computer and an information recording medium. The apparatus has a transfer mode control device which selects the optimal data transfer operation mode for transferring data between the host computer and the information recording medium. The transfer mode control device determines which one of a duration of a modulation-demodulation operation, data transfer from the apparatus to the information recording medium, and a duration of a data transfer operation, transfer of data from the apparatus to the host computer, is longer. The transfer mode control device selects a parallel mode in which the modulation-demodulation operation and the data transfer operation are performed in parallel when a duration of the modulation-demodulation operation is longer than the data transfer operation. The transfer mode control device selects a buffering mode in which the modulation-demodulation operation and the data transfer operation are performed sequentially when a duration of the data transfer operation is longer than the modulation-demodulation operation.

8 Claims, 10 Drawing Sheets

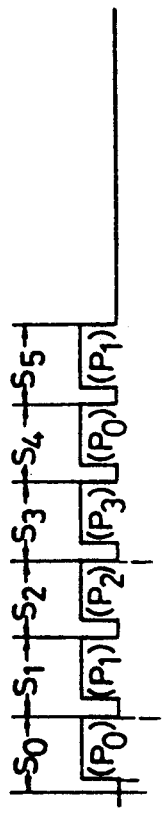
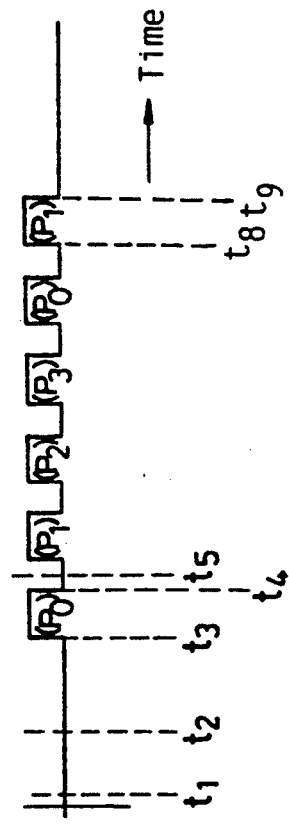
FIG. 2(a) MODEM busy signal (111)
FIG. 2(b) Error correction busy signal (109)
FIG. 2(c) Data transfer busy signal (107)

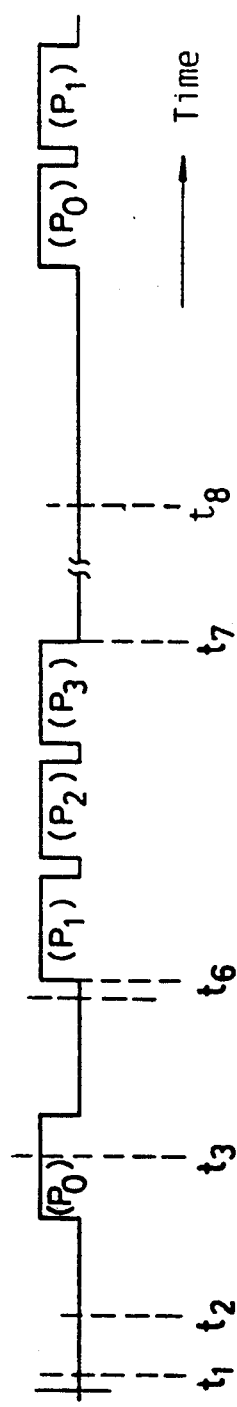
FIG. 3(a) MODEM busy signal (111)
FIG. 3(b) Error correction busy signal (109)
FIG. 3(c) Data transfer busy signal (107)

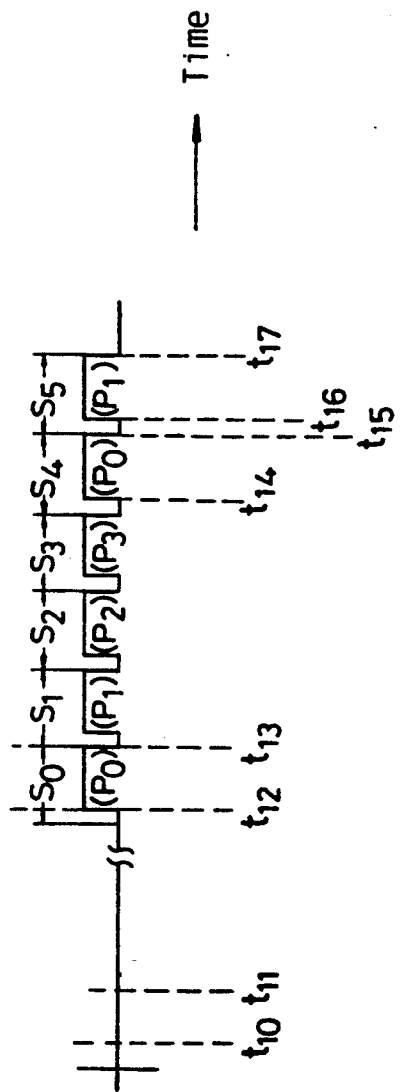
FIG. 5(a)
Data transfer busy signal (107)
FIG. 5(b)
Error correction busy signal (109)
FIG. 5(c)
MODEM busy signal (111)

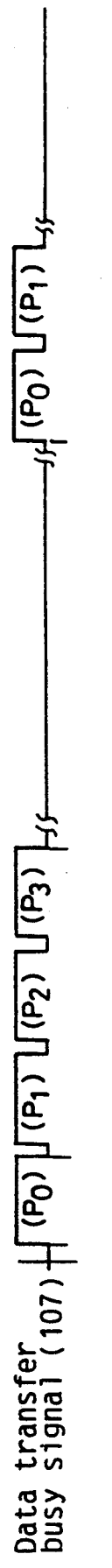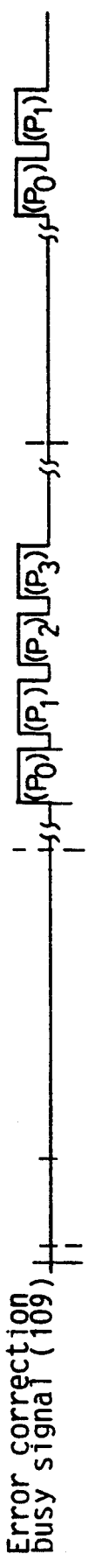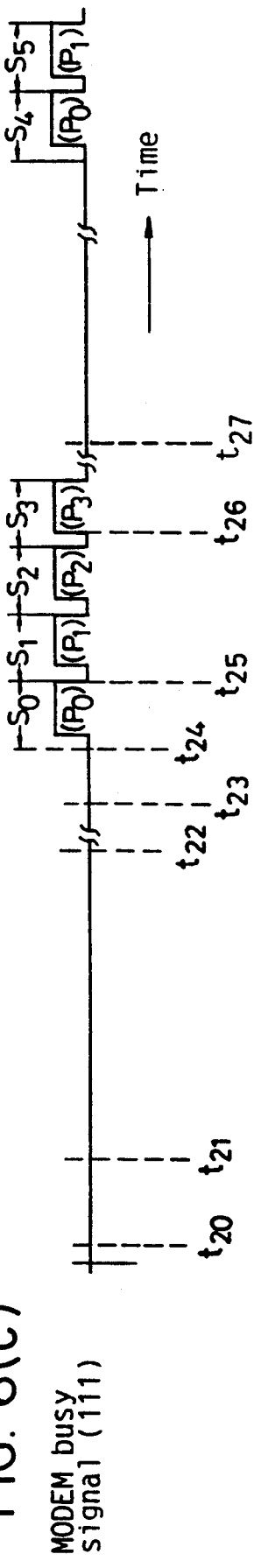
FIG. 6(a) Data transfer busy signal (107)
FIG. 6(b) Error correction busy signal (109)
FIG. 6(c) MODEM busy signal (111)

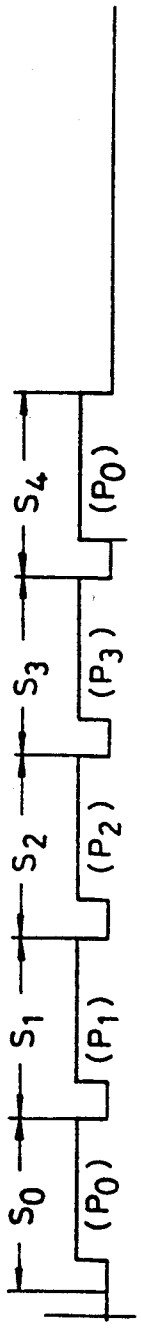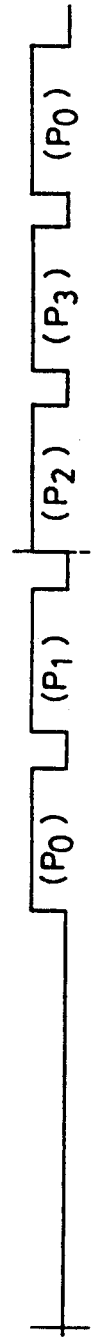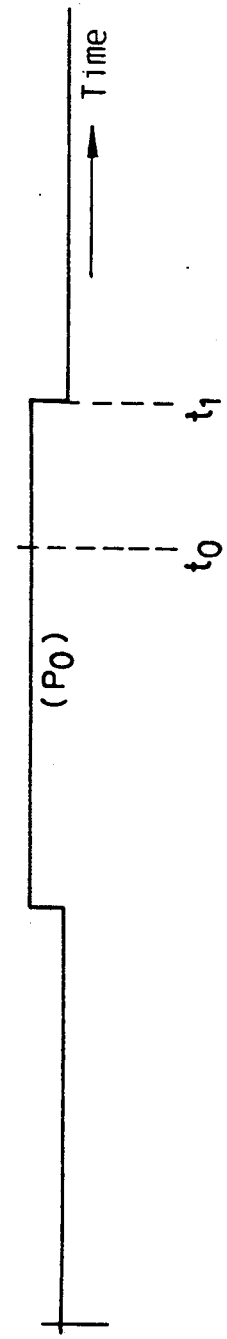
FIG. 10(a) (PRIOR ART) MODEM busy signal (111)
FIG. 10(b) (PRIOR ART) Error correction busy signal (109)
FIG. 10(c) (PRIOR ART) Data transfer busy signal (107)
FIG. 10(d) (PRIOR ART) Data transfer busy signal (107)

INFORMATION RECORDING-REPRODUCING APPARATUS FOR OPTIMIZING DATA TRANSFER

FIELD OF THE INVENTION AND RELATED ART STATEMENT

1. Field of the Invention

The present invention relates generally to an information recording-reproducing apparatus for recording and reproducing data in units of a sector by using a disk-shaped recording-reproducing medium, and more particularly to an information recording-reproducing apparatus for efficiently transferring the data between the information recording-reproducing apparatus and a host computer.

2. Description of the Related Art

Recently, an information recording-reproducing apparatus using a medium, such as an optical disk, on which a spiral track is formed, is utilized for a secondary storage of a personal computer, a work station and various host computers. In such information recording-reproducing apparatus, write operation and read operation of data are performed with a constant speed. On the other hand, a data transfer speed between the host computer and the information recording-reproducing apparatus depends on the transfer ability of the host computer, and in general, there is a large difference between the speed of data recording-reproducing operation and the data transfer speed. Namely, in the personal computer, since the data transfer speed thereof is lower than the speed of the data recording-reproducing operation of the information recording-reproducing apparatus, the ability of the information recording-reproducing apparatus can not be fully utilized, irrespective of improvement of the speed of the recording-reproducing operation achieved by high density recording or a high revolution speed of the optical disk.

FIG. 9 is a circuit block diagram of the information recording-reproducing apparatus in the prior art. Referring to FIG. 9, a drive unit 1, whereon is mounted an information recording medium such as an optical disk, is controlled by a controller 2. A host computer 3 is coupled to the controller 2.

The controller 2 comprises a microprocessor 4 for controlling the entire controller 2 in compliance with a firmware stored therein. A target sector detection circuit 5 detects a target sector of the optical disk in compliance with a target sector address signal 100 which is set in the microprocessor 4. A host interface circuit 6 controls transfer operation of a write data signal 101 to be recorded in the target sector and a read data signal 102 reproduced from the target sector between the host computer 3 and the controller 2. Hereinafter, the word "write data" means "data to be recorded" which is transmitted from the host computer 3 to the controller 2, the word "read data" means reproduced data which is transmitted from the controller 2 to the host computer 3. Both the write data and read data are not attached with an error correction code. An error correction circuit 7 generates recording data by attaching an error correction code to the write data signal 101 or generates read data signal 102 by applying an error correction process to read data. A data MODEM circuit 8 generates a modulated signal 103 by modulating recording data, thereby to record the modulated recording data in the target sector. Or alternatively, the data MODEM circuit 8 generates reproduction data by demodulating a reproduced signal 104 which is read out from the target sector and given from the drive unit 1. A memory circuit 9 is coupled to the host interface circuit 6, the error correction circuit 7 and the data MODEM circuit 8 through a data bus 10, and stores data in the process of the data recording-reproducing operation.

The operation of the recording-reproducing apparatus in the prior art is elucidated hereafter.

In the data recording operation to a sector, a device command signal 105 of the host computer 3 is received by the microprocessor 4, and thereby a data transfer control signal 106 is transmitted from the microprocessor 4 to the host interface circuit 6. The host interface circuit 6 is activated by the data transfer control signal 106, and a data transfer busy signal 107 is issued. At that time, a write data signal 101 is transmitted from the host computer 3 to the host interface circuit 6, and the write data signal 101 is memorized in the memory circuit 9 through the data bus 10.

Subsequently, an error correction control signal 108 is transmitted from the microprocessor 4 to the error correction circuit 7, and the error correction circuit 7 is activated. Hence an error correction busy signal 109 is transmitted from the error correction circuit 7 to the microprocessor 4. At that time, an error correction code which corresponds to the write data signal 101 read out of the memory circuit 9 is calculated in the error correction circuit 7. The error correction code is attached to the write data signal 101, and the write data signal 101 is again stored in the memory circuit 9.

After the target address is set in the target sector detection circuit 5 by the microprocessor 4, an address signal is discriminated from the reproduced signal 104 transmitted from the drive unit 1 and is demodulated by the target sector detection circuit 5. Then the address signal is compared with the target sector address signal 100, and the target sector is detected by coincidence between the address signal and the target sector address signal 100. After detection of the target sector address, a MODEM control signal 110 is transmitted from the target sector detection circuit 5 to the data MODEM circuit 8. Consequently, a MODEM busy signal 111 is transmitted from the data MODEM circuit 8 to the microprocessor 4. At that time, the write data signal 101 stored in the memory circuit 9 is read out and is modulated by the data MODEM circuit 8, and a modulated signal 103 is generated. The modulated signal 103 is transmitted to the drive unit 1 and is recorded in the target sector of the optical disk. Finally, a command status signal 112 is transmitted from the microprocessor 4 to the host computer 3, and the command process is completed.

The reproducing operation of data of a sector is elucidated hereafter. The microprocessor 4 receives the device command signal 105 from the host computer 3, and then transmits the target sector address signal 100 to set a target sector address in the target sector detection circuit 5. In the target sector detection circuit 5, the address signal is discriminated from the reproduced signal 104 and is demodulated. Then the address signal is compared with the target sector address signal 100, and when the address signal and the target sector address signal 100 are in coincidence, the target sector address is detected. After detection of the target sector, the MODEM control signal 110 is transmitted from the target sector detection circuit 5 to the data MODEM circuit 8, and then the MODEM busy signal 111 is transmitted from the MODEM control circuit 8. At that time, the data MODEM circuit 8 transmits the read data signal 102 which is discriminated and demodulated from the reproduced signal 104 to store in the memory circuit 9.

Subsequently, the error correction control signal 108 is transmitted from the microprocessor 4 to the error correction circuit 7, and thereby the error correction circuit 7 is activated and the error correction busy signal 109 is transmitted to the microprocessor 4. At that time, in the error correction circuit 7, the read data stored in the memory circuit 9 is read out and the error correction process is performed. Moreover, the data transfer control signal 106 is transmitted from the microprocessor 4 to the host interface circuit 6, and thereby the host interface circuit 6 is activated and transmits the data transfer busy signal 107. At that time, the host interface circuit 6 reads out the read data signal 102 from the memory circuit 9 and transfers it to the host computer 3. Finally, the command status signal 112 is transmitted from the microprocessor 4 to the host computer 3, and the command process is completed.

In the above-mentioned data recording-reproducing operation of one sector, the data transfer process, error correction process and data MODEM process are accomplished in the named order. Moreover, in the data recording-reproducing operation of plural sectors, these three kinds of processes are accomplished by parallel operation. In the parallel operation, the memory circuit 9 is divided into plural pages, and "write data" and "read data" corresponding to each target sector are stored in each page which is divided as mentioned above. Namely, the host interface circuit 6, the error correction circuit 7 and data MODEM circuit 8 parallelly accomplish the data transfer process, the error correction process and data MODEM process, by using respective pages which are different from each other.

FIG. 10 is a time chart of data reproduction operation in the parallel operation. Referring to FIG. 10, it is shown that the memory circuit 9 is divided into four pages of a page $P_0$, a page $P_1$, a page $P_2$ and a page $P_3$, and the data reproduction operation is applied to the five sectors of a sector $S_0$, a sector $S_1$, a sector $S_2$, a sector $S_3$ and a sector $S_4$. A diagram (a) in FIG. 10 shows the MODEM busy signal 111 which is transmitted from the data MODEM circuit 8 to the microprocessor 4. A diagram (b) in FIG. 10 shows the error correction busy signal 109 which is transmitted from the error correction circuit 7 to the microprocessor 4, and the error correction process is performed with a processing speed which is substantially equal to the speed of the data demodulation process. A diagram (c) in FIG. 10 shows the data transfer busy signal 107 which is transmitted from the host interface circuit 6 to the microprocessor 4. In this case the data transfer process is accomplished with a processing speed which is substantially equal to that of the data demodulation process. Additionally, a diagram (d) in FIG. 10 shows the data transfer busy signal 107, which is transmitted from the host interface circuit 6 in a low speed data transfer process. And in the low speed data transfer process, three times of the process time in the data demodulation process is required.

The respective pages which are used by the host interface circuit 6, the error correction circuit 7 and data MODEM circuit 8 are controlled by page counters (not shown) which are mounted in each circuit. The page counters are initially set by the microcomputer 4 so that the head page (page $P_0$) is used by the host interface circuit 6, the error correction circuit 7 and data MODEM circuit 8. In each circuit, the page counter is advanced after each completion of the process of one sector ($P_0 \rightarrow P_1 \rightarrow P_2 \rightarrow P_3$). In the above-mentioned operation, the page counter is returned from the page $P_3$ to the page $P_0$, and hence each page in the memory circuit 9 is periodically used.

In the event that the data transfer process can be performed with a processing speed, which is substantially equal to that of the data demodulation process as shown in the diagram (c) in FIG. 10, the data reproduction operation is either of the followings:

(1) Operation of data demodulation process of the sector $S_0$ using the page $P_0$, (2) Parallel operation of (i) data demodulation process of the sector $S_1$ which uses the page $P_1$ and (ii) error correction process with respect to the reproduced data from the sector $S_0$ which is stored in the page $P_0$, (3) Parallel operation of (i) data demodulation process of sector $S_2$ which uses the page $P_2$, (ii) error correction process, with respect to the reproduced data from the sector $S_1$, which is stored in the page $P_1$, and (iii) data transfer process with respect to the reproduced data from the sector $S_0$ which is stored in the page $P_0$, (4) Repetition of operation the above-mentioned process (3) with respect to successive two sectors $S_3$ and $S_4$, (5) Parallel operation of (i) error correction process with respect to the reproduced data from the sector $S_4$ stored in the page $P_0$ and (ii) the data transfer process with respect to the reproduced data from the sector $S_3$ stored in the page $P_3$, and (6) Operation of data transfer process with respect to the reproduced data from the sector $S_4$ stored in the page $P_0$.

As mentioned above, in the event that the execution time (herein, "execution time" means time period for operation) of the data transfer process is shorter than the execution time for the data demodulation process, reproduction operation of successive data is realizable.

However, in the event that the information recording-reproducing apparatus is coupled to a host computer having a execution time of the data transfer process which is longer than that of the data demodulation process as shown in the diagram (d) of FIG. 10. In such case, the data demodulation process of the sector $S_4$ using the page $P_0$ is liable to be activated at a time $t_0$ before completion of the data transfer process of the reproduced data stored in the page $P_0$ at a time $t_1$. In the above-mentioned case, when the data demodulation process is started, the host interface circuit 6 and the data MODEM circuit 8 access to the same page $P_0$. And the content of the page $P_0$ is rewritten by the data MODEM circuit 8 before completion of the data transfer process. Consequently, when the data transfer speed is lower than that of the data reproduction speed, if the data demodulation operation is successively performed with respect to a plurality of sectors by the data MODEM circuit 8, wrongly demodulated information is transferred to the host computer 3.

Moreover, in the data recording operation, in the event that the execution speed of the data transfer process is lower than that of the data modulation process and successive operation for recording data to a plurality of sectors is performed by the data MODEM circuit 8, the data from the host computer 3 is not transferred in time and wrong data which is stored in the memory circuit 9 is recorded in the medium.

OBJECT AND SUMMARY OF THE INVENTION

An object of the present invention is to provide an information recording-reproducing apparatus which can accomplish efficient data transfer operation with reliability by controlling recording-reproducing operation in accordance with a data transfer speed of a host computer.

An information recording-reproducing apparatus in accordance with the present invention comprises:

a data MODEM circuit for modulating data to be recorded to an information recording medium and for demodulating data reproduced therefrom;

memory means for storing the data to be recorded to the information recording medium and the data reproduced therefrom;

transfer mode control means for controlling to perform parallelly data modulation-demodulation process of the data MODEM circuit and data transfer process between a host computer and the information recording reproducing apparatus or to perform alternately the data transfer process and the data modulation-demodulation process of each predetermined data processing unit on the basis of a MODEM busy signal representing execution of modulation or demodulation of data and a data transfer busy signal representing execution of transfer of data between the host computer and the information recording-reproducing apparatus.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 2 (A, B and C) are time charts of data reproduction operation in a parallel mode in which an execution time of data transfer operation is shorter than that of data demodulation operation;

FIG. 3 (A, B and C) are time charts of data reproduction operation in a buffering mode in which an execution time of the data transfer operation is longer than that of the data demodulation operation;

FIG. 5 (A, B, and C) are time charts of data recording operation in the parallel mode;

FIG. 6 (A, B and C) are time charts of the data recording operation in the buffering mode;

FIG. 10 (A, B, C and D) are time charts of the reproduction operation of the information recording-reproducing apparatus in the prior art.

It will be recognized that some or all of the Figures are schematic representations for purposes of illustration and do not necessarily depict the actual relative sizes or locations of the elements shown.

DESCRIPTION OF THE PREFERRED EMBODIMENTS

Figure 1:
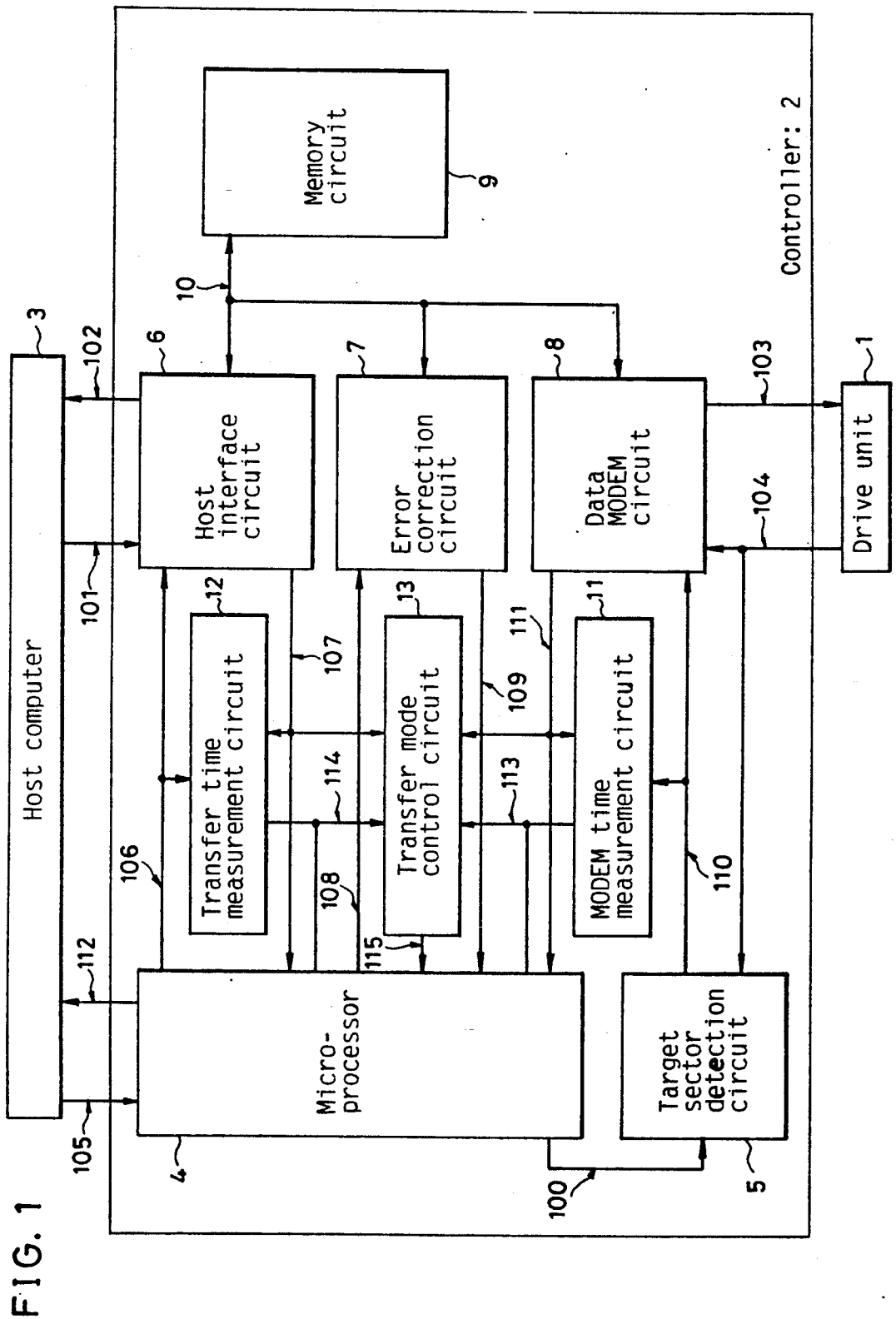
FIG. 1 is a circuit block diagram of an embodiment of an information recording-reproducing apparatus in accordance with the present invention.

FIG. 1 is a block diagram of an embodiment of the information recording-reproducing apparatus in accordance with the present invention. Referring to FIG. 1, a drive unit 1 which is mounted with an information recording medium such as an optical disk is controlled by a controller 2. A host computer 3 is coupled to the controller 2.

The controller 2 comprises a microprocessor 4 for controlling the entire controller 2 in compliance with a firmware stored therein. A target sector detection circuit 5 detects a target sector of the optical disk in compliance with a target sector address signal 100 which is set in the microprocessor 4. A host interface circuit 6 controls transfer operation of a write data signal 101 to be recorded in the target sector and a read data signal 102 reproduced from the target sector between the host computer 3 and the controller 2. An error correction circuit 7 generates recording data by attaching an error correction code to the write data signal 101 or generates read data signal 102 by applying an error correction process to read data. A data MODEM circuit 8 generates a modulated signal 103 by modulating recording data and records the recording data in the target sector, or generates reproduction data by demodulating a reproduced signal 104 which is read out from the target sector. A memory circuit 9 is coupled to the host interface circuit 6, the error correction circuit 7 and the data MODEM circuit 8 through a data bus 10, and stores data in the process of the data recording-reproducing operation.

The controller 2 is provided with a MODEM time measuring circuit 11, a transfer time measuring circuit 12 and a transfer mode control circuit 13. In the MODEM time measuring circuit 11, an execution time of the MODEM process is measured on the basis of the MODEM busy signal 111 which is transmitted from the data MODEM circuit 8. In the transfer time measuring circuit 12, an execution time of data transfer process is measured on the basis of the data transfer busy signal 107 which is transmitted from the host interface circuit 6. In the transfer mode control circuit 13, both the status of the MODEM busy signal 111 and the data transfer busy signal 107 are inspected, and an operation mode of the data transfer process is determined by comparing the MODEM time represented by a MODEM time signal 113 with the data transfer time represented by a data transfer time signal 114.

Reproduction operation

The reproduction operation in the embodiment is elucidated hereafter. In the embodiment, the memory area of the memory circuit 9 is divided into four pages (pages $P_0$, $P_1$, $P_2$ and $P_3$), for example, and data reproduction operation and data recording operation are applied to six sectors (sectors $S_0$, $S_1$, $S_2$, $S_3$, $S_4$ and $S_5$) of a medium.

FIG. 2 is a time chart of the operation of the controller 2 in data reproduction operation in which the execution time of the data transfer process is shorter than the execution time of the data demodulation process (hereinafter, the above-mentioned operation is referred to as a "parallel mode").

FIG. 3 is a time chart of the operation of the controller 2 in the data reproduction operation in which the execution time of the data transfer process is longer than the execution time of the data demodulation process (hereinafter, the above-mentioned operation is referred to as a "buffering mode").

Referring to FIG. 2 and FIG. 3, diagrams (a) show the status of the MODEM busy signal 111 which is transmitted from the data MODEM circuit 8, diagrams (b) show an error correction busy signal 109 which is transmitted from the error correction circuit 7 and diagrams (c) show a data transfer busy signal 107 which is transmitted from the host interface circuit 6.

Figure 4:
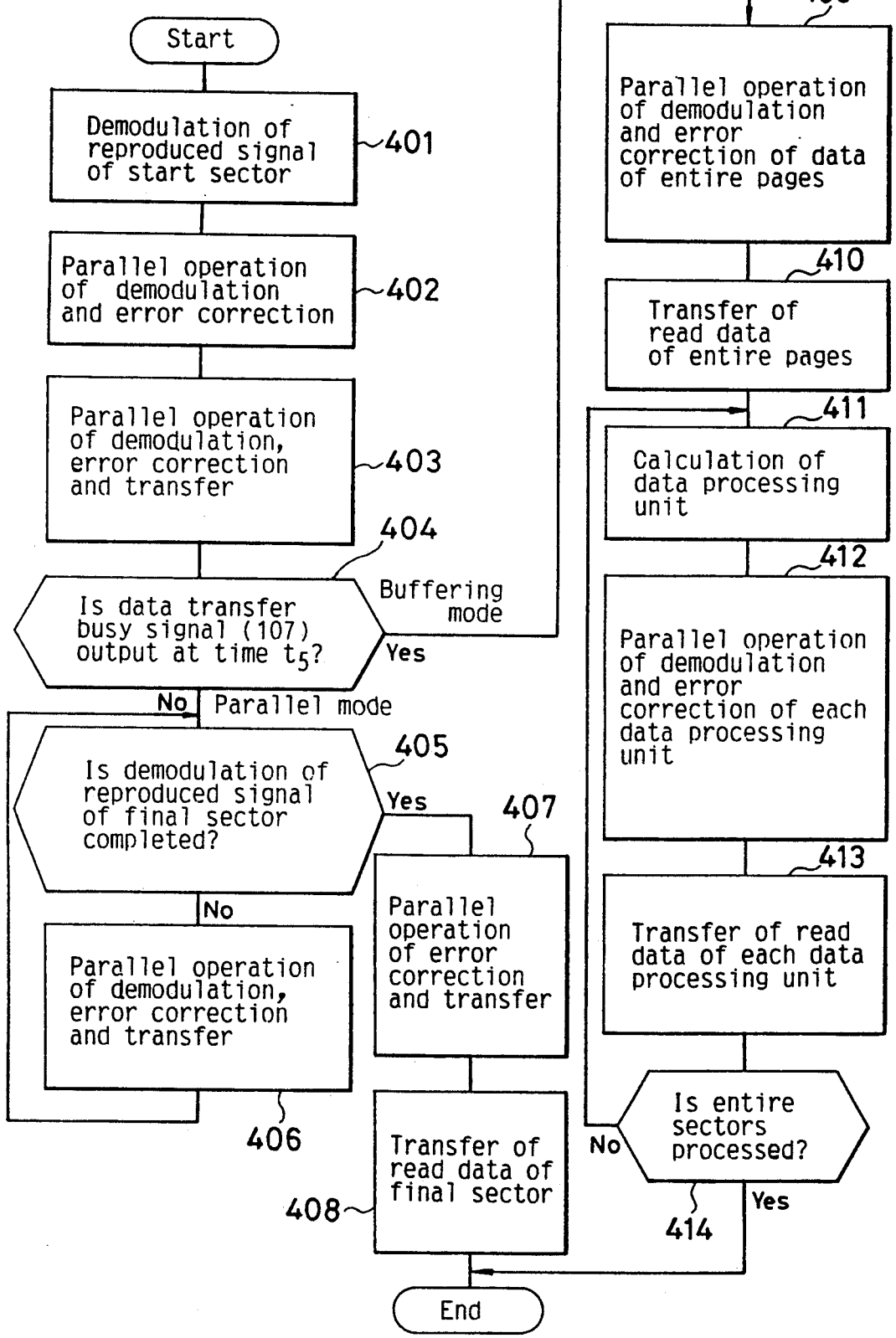
FIG. 4 is a flow chart of data reproduction operation.
Figure 7:
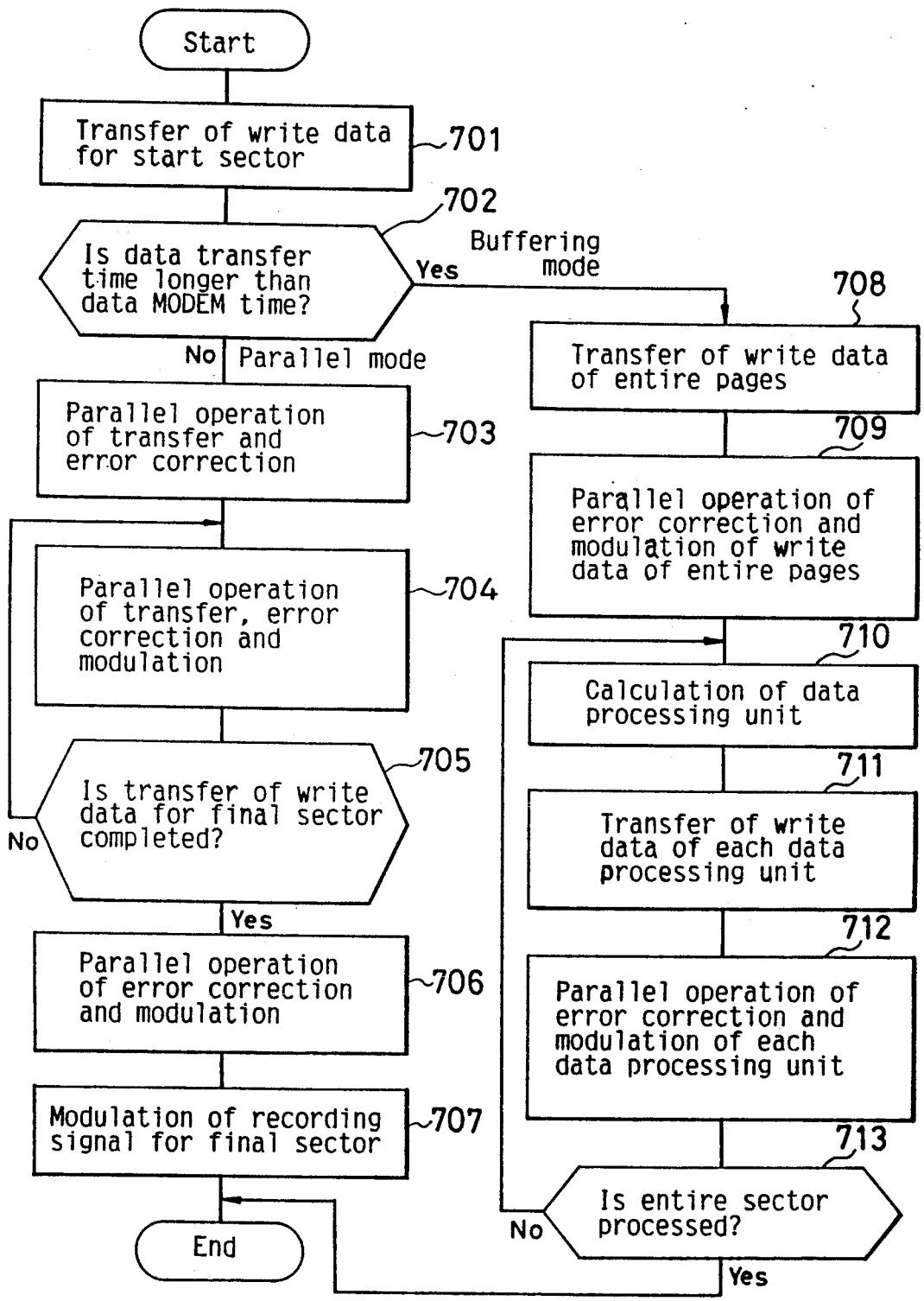
FIG. 7 is a flow chart of a control process of the data recording operation.

The data reproduction operation is elucidated hereafter with reference to FIGS. 1, 2 and 3 and a flow chart shown in FIG. 4.

Each page counter which is mounted on the host interface circuit 6, error correction circuit 7 and data MODEM circuit 8 is set to "page $P_0$" by the microprocessor 4 which receives a device command signal 105 from the host computer 3. Subsequently, the address of a start sector $S_0$ is set in the target sector detection circuit 5 by a target sector address signal 100 which is transmitted from the microprocessor 4.

On the other hand, the address signal of a reproduced signal 104 of the drive unit 1 is discriminated from the reproduced signal 104 and is demodulated by the target sector detection circuit 5. Subsequently, the address signal is compared with the target sector address signal 100. And when the address signal and the target sector address signal 100 agrees with each other, a MODEM control signal 110 is transmitted to the data MODEM circuit 8 and to the MODEM time measuring circuit 11 from the target sector detection circuit 5, thereby to activate the data MODEM circuit 8. Then data demodulation process of the start sector $S_0$ is performed by using the page $P_0$ by the activated data MODEM circuit 8.

Referring to FIG. 2 and FIG. 3, the MODEM time measuring circuit 11 is activated by the MODEM control signal 110 at a time $t_1$; namely, the measurement of a data demodulation process time is started by the rise edge of the MODEM busy signal 111 which is transmitted from the data MODEM circuit 8 during data demodulation process. Then, the data demodulation process is completed at a time $t_2$ of the fall edge of the MODEM busy signal 111, and thereby the time measurement in the MODEM time measurement circuit 11 is completed and the measured MODEM process time signal 113 is transmitted to the transfer mode control circuit 13 (Step 401 in FIG. 4).

After completion of the data demodulation process of the start sector $S_0$, the address of the second sector $S_1$ is set in the target sector detection circuit 5 by the target sector address signal 100 from the microprocessor 4. Then the MODEM control signal 110 is transmitted by detection of the target sector by the target sector detection circuit 5, and the data demodulation process of the sector $S_1$ is performed by using the page $P_1$. The activation of the data demodulation process is detected by the status of the MODEM busy signal 111; and the error correction control signal 108 is transmitted from the microprocessor 4; and the error correction process is performed in parallel (Step 402) with respect to the reproduced data from the sector $S_0$ which is stored in the page $P_0$.

After completion of the data demodulation process of the sector $S_1$ and the error correction process with respect to the data of the page $P_0$, the target sector address signal 100 is set by the microprocessor 4, and the data demodulation process of the sector $S_2$ is activated by using the page $P_2$. Subsequently, the error correction process with respect to the data of the page $P_1$ and the data transfer process with respect to the data of the page $P_0$ are activated at a time $t_3$ by the data transfer control signal 106 of the microprocessor 4 (Step 403).

Completion of the data demodulation process for the sector $S_2$ is detected by the status of the MODEM busy signal 111 at a time $t_5$, and the status of the data transfer busy signal 107 is inspected by the transfer mode control circuit 13. Then the transfer mode control signal 115 is transmitted in accordance with the status. In this case, since the data transfer busy signal 107 is a low level at a time $t_5$ as shown in the diagram (c) of FIG. 2 (nonbusy status) and the time interval between the times $t_3$ and $t_4$ is shorter than the time interval between the times $t_1$ and $t_2$, the transfer mode control signal 115 which is set in the "parallel mode" is transmitted from the transfer mode control circuit 13 to the microprocessor 4 (Step 404). Subsequently, data reproduction operation as shown in FIG. 2 is performed in compliance with Steps 404–408.

On the other hand, in the event that the data transfer busy signal 107 is of high level at the time $t_3$ as shown on the diagram (c) in FIG. 3 (busy status), the transfer mode control signal 115 which is set to the "buffering mode" is transmitted from the transfer mode control circuit 13. At that time, the data reproduction operation is performed in compliance with Steps 409–414.

Parallel mode

In the data reproduction operation of the parallel mode, the Steps 405 and 406 are repeated until completion of the data reproduction with respect to the final sector $S_5$ (Steps 405 and 406).

After completion of the data demodulation process for the sector $S_1$, the error correction process (in the time period $t_3$–$t_5$) with respect to the data stored in the page $P_1$ and the data transfer process ($t_3$–$t_4$) with respect to the data stored in the page $P_0$ are performed in parallel by the microprocessor 4 (Step 407).

Finally, data transfer process with respect to the data of the sector $S_1$ stored in the page $P_1$ is performed (in the time period $t_8$–$t_9$), and thus the data reproduction operation is completed. Then, the command status signal 112 is transmitted from the microprocessor 4 to the host computer 3 (Step 408).

Buffering mode

The data reproduction operation in the buffering mode is elucidated with reference to FIG. 3. The data demodulation process and the error correction process are performed in parallel until completion of the data demodulation process using the final page $P_3$ at a time $t_5$ in FIG. 3 (Step 409). The data transfer process with respect to the data stored in the page $P_0$ is performed in parallel with the data demodulation process.

On the other hand, the data transfer process with respect to the data stored in the pages $P_1$, $P_2$ and $P_3$ is successively performed from a time $t_6$ after completion of the data demodulation process and error correction of the data stored in the pages $P_1$, $P_2$ and $P_3$. Thus the data reproduction operation of four sectors $S_0$–$S_3$ is completed at a time $t_7$ (Step 410).

Data processing unit

Subsequently, the number of sectors which have not yet been processed is evaluated by subtracting the number of sectors, which are already processed from the block count (which means number of sector), which is designated by the device command signal 105. The number of sectors which are not yet processed is compared with a capacity (four sectors in the embodiment) of the memory circuit 9. When the number of the sectors which are not yet processed is larger than the capacity of the memory circuit 9, four sectors are made to one data processing unit, and each data processing unit having four sectors is processed at a time (Step 411).

The data demodulation process and error correction process are performed with respect to each sector of the data processing unit by the microprocessor 4. First, data demodulation process with respect to the start sector $S_0$ of the data processing unit is performed ($t_1$–$t_2$), second, the data demodulation process and data correction process are performed in parallel with respect to successive sectors $S_1$, $S_2$ and $S_3$, and finally, the error correction process is applied to the final sector $S_3$ of the data processing unit (Step 412).

Then, the data transfer process is successively performed with respect to each sector of the data processing unit by the microprocessor 4, and data reproduction operation with respect to the data processing unit is completed (Step 413).

Then the block count which is designated by the device command 105 is compared with the number of sectors which are already processed. After completion of the data reproduction operation with respect to entire sectors, the command status signal 112 is transmitted from the microprocessor 4 to the host computer 3. On the other hand, when the sector which has not yet been operated on by the data reproduction operation remains, the flow advances to Step 411, and the data reproduction operation is applied to the subsequent data processing unit from a time $t_8$ in FIG. 3 (Step 414).

In the embodiment, the memory circuit 9 comprises memories which stores reproduction data of four sectors; however, the data reproduction operation of six sectors $S_0$–$S_5$ must be performed. In general, in the parallel mode reproduction operation of the data which are larger than the capacity of the memory circuit 9, the Step 406 is periodically repeated. On the other hand, in the reproduction operation of the buffering mode, the data to be reproduced is divided into a plurality of the data processing units, and the operation is periodically repeated from Step 411 to Step 413.

In the above-mentioned Step 404, the status of the demodulation busy signal 111 and the data transfer busy signal 107 are inputted into the transfer mode control circuit 13, and the execution time of the data demodulation process ($t_2$–$t_1$) and the execution time of the data transfer process ($t_4$–$t_3$) in FIG. 2 are compared with each other, and hence an operation mode of the data reproduction operation is determined. The operation mode is easily determined by inspecting these busy signals in compliance with the firmware stored in the microprocessor.

In Step 404, though the execution time of the data transfer process is directly compared with the execution time of the data demodulation process from the status of the busy signals, the execution time of the data demodulation process can be evaluated by a physical format of the disk. For example, in the event that the disk having twenty-five sectors in one track thereof is rotated with the revolution speed of 2400 rpm, the running time of one sector is 1 millisecond. Consequently, the running time length for one data field is evaluated by subtracting the running time length of an ID field and that of a gap area part from the running time length (1 millisecond) of the sector. The time length or interval evaluated as elucidated above is applied to the data demodulation time of the data MODEM time measurement circuit 11. Namely, the data demodulation time is set on a timer of the transfer mode control circuit 13, and the timer is activated at the start of the data transfer operation. Then, at the time at which the time measurement by the timer is completed, the status of the data transfer busy signal 107 is inspected by the transfer mode control circuit 13, and thereby the operation mode is determined. The process is realizable by measuring the calculated execution time of the data demodulation process by the microprocessor 4 having the timer and by inspecting the status of the data transfer busy signal 107.

In the above-mentioned process, the operation mode of the data transfer is determined by parallel operation of the data demodulation process and the data transfer process, which are firstly performed. However, in the MCAV format (Modified Constant Angular Velocity format: the recording area of a disk is divided into plural zones between the central part and the peripheral part, and the number of sectors per track in the central zone is different from the number of sectors of one track in the peripheral zone.), the number of sectors in a track of an inner zone is less than that of the outer zone. Consequently, the demodulation time of a sector in the inner zone is longer than that of a sector in the outer zone. In the information recording-reproducing apparatus using such a medium, when the data reproduction operation of the sectors extending over plural zones is commanded by the device command, the operation mode of the data transfer which is firstly determined is changed during the reproduction operation. Namely, when the data demodulation process is started from a start sector of a zone in which the length of sector is different from the former sector, the operation mode of the data transfer is changed in compliance with the process elucidated at the Step 404. Then, the data reproduction operation with respect to each sector in this zone is performed in compliance with the new operation mode. Consequently, it may occur that the data reproduction operation is performed on the basis of the buffering mode in the peripheral zone and is performed on the basis of the parallel mode in the center zone. Namely, in the event that the data reproduction operation is advanced from the peripheral part of the disk to the center part thereof, the operation mode is switched from the buffering mode to the parallel mode. On the contrary, in the event that the data reproduction operation is advanced from the center part of the disk to the peripheral part thereof, the operation mode is switched from the parallel mode to the buffering mode.

Recording operation

The data recording operation to six sectors $S_0$–$S_5$ is elucidated hereafter. FIG. 5 is a time chart of the data recording operation in which the execution time of the data transfer process is shorter than that of the data modulation process (parallel mode), and FIG. 6 is a time chart of the data recording operation in which the execution time of the data transfer process is longer than that of the data modulation process (buffering mode).

Referring to FIG. 5 and FIG. 6, the diagrams (a) show the status of the data transfer busy signal 107 which is transmitted from the host interface circuit 6, the diagrams (b) show the status of the error correction busy signal 109 which is transmitted from the error correction circuit 7, and the diagrams (c) show the status of the MODEM busy signal 111 which is transmitted from the data MODEM circuit 8. The data recording operation is elucidated with reference to FIG. 1, FIG. 5, FIG. 6 and FIG. 7 of the flow chart thereof.

The device command signal 105 which demands data recording operation is transmitted from the host computer 3, and the respective page counters which are mounted in the host interface circuit 6, error correction circuit 7 and data MODEM circuit 7 are set to page $P_0$ by the microprocessor 4. Subsequently, the data transfer control signal 106 is transmitted to the host interface circuit 6 and the transfer time measurement circuit 12 from the microprocessor 4. The host interface circuit 6 is activated by the data transfer control signal 106 and transfers the data to be recorded in the sector $S_0$ to the page $P_0$ of the memory circuit 9. The transfer time measurement circuit 12 is also activated by the data transfer control signal 106 at a time $t_{10}$ in FIG. 5, and thereby the time interval between times $t_{10}$ and $t_{11}$ of the busy status of the data transfer busy signal 107 is measured. Then, the data transfer process is completed at the time $t_{11}$, and the status of the data transfer busy signal 107 is changed. Consequently, the time measurement of the transfer time measurement circuit 12 is completed, and the data transfer time signal 114 representing the time interval $(t_{11}-t_{10})$ is transmitted to the transfer mode control circuit 13 (Step 701).

The data transfer time signal 114 is received by the transfer mode control circuit 13, and the data transfer time signal 114 is compared with the data MODEM time signal 113 which is transmitted from the data MODEM time measuring circuit 11 in the Step 401 of the data reproducing operation. At that time, in the event that the time interval $(t_{11}-t_{10})$ of the data transfer time signal 114 is shorter than that of the data MODEM time signal 113, the transfer mode control signal 115 which is set in the parallel mode is transmitted from the transfer mode control circuit 13 to the microprocessor 4 (Step 702).

Subsequently, the data recording operation as shown in the timing chart of FIG. 5 is performed in compliance with the Steps 703-707 by the microprocessor 4. On the other hand, in the event that the time of the data transfer time signal 114 is longer than that of the data MODEM time signal 113, the transfer mode control signal 115 set in the buffering mode is transmitted from the transfer mode control circuit 13 to the microprocessor 4. At that time, the data recording operation shown in the timing chart of FIG. 6 is performed in compliance with the Steps 708-713 by the microprocessor 4.

Parallel mode

In the data recording operation of the parallel mode, after completion of the data transfer process to the page $P_0$ of the memory circuit 9 at a time $t_{11}$, the data transfer control signal 106 is transmitted again to the host interface circuit 6 from the microprocessor 4, and the data transfer process to the page $P_1$ of the memory circuit 9 is started as shown by the diagram (a) of FIG. 5. When the start of the data transfer process is detected by the status of the data transfer busy signal 107, the error correction control signal 108 is transmitted from the microprocessor 4. Then the error correction process for attaching an error correction code to the data stored in the page $P_0$ is performed in parallel as shown by the diagram (b) of FIG. 5 (Step 703).

After completion of the data transfer process with respect to the data of the page $P_1$ and the error correction process with respect to the data of the page $P_0$, the address of the start sector $S_0$ is set in the target sector detection circuit 5 by the target sector address signal 100 by the microprocessor 4. Then, the address signal of the reproduced signal 104 is discriminated by the target sector detection circuit 5, and the address is compared with the target sector address. When the address and the target sector address are in coincidence, the MODEM control signal 110 is transmitted to the data MODEM circuit 8. Then, the data MODEM circuit 8 is activated by the MODEM control signal 110, and the recording data stored in the page $P_0$ is modulated. The modulated recording data is transmitted to the drive unit 1 and is recorded in the sector $S_0$ in the time period between times $t_{12}$ and $t_{13}$. Start of the data modulation process is detected by the status of the MODEM busy signal 111, and hence data transfer control signal 106 and error correction control signal 108 are transmitted. Thereby, the data transfer process and error correction process using a new page is performed in parallel by the microprocessor 4 (Step 704).

In the above-mentioned data recording operation of the parallel mode, the Step 704 is repeated by the microprocessor 4 until completion of the transfer process of data to be recorded (Step 705).

After completion of the data transfer process for the final sector at a time $t_{14}$, the error correction control signal 108 and the MODEM control signal 110 are transmitted from the microprocessor 4. And error correction process of the data stored in the page $P_1$ and data modulation process of the data stored in the page $P_0$ are performed in parallel in the time period between times $t_{14}$ and $t_{15}$ (Step 706).

In the microprocessor 4, the data modulation process is applied to the last data stored in the page $P_1$ between times $t_{16}$ and $t_{17}$, and the data is recorded in the final sector $S_5$. After completion of the data recording operation of the parallel mode, the command status signal 112 is transmitted to the host computer 3 from the microprocessor 4 (Step 707).

Buffering mode

In the data recording operation of the buffering mode shown by the timing chart of FIG. 6, after completion of data transfer process to the page $P_0$ at a time $t_{21}$, the data transfer control signal 106 is transmitted from the microprocessor 4, and the data transfer process from the page $P_1$ to the final page $P_3$ is successively performed between times $t_{21}$ and $t_{22}$ (Step 708).

After the data is transferred to the entire pages of the memory circuit 9 at the time $t_{22}$, first, error correction process is performed with respect to the page $P_0$ at a time $t_{23}$; and next, error correction process to the data of the page $P_1$ and the data modulation process to the data of the page $P_0$ are performed in parallel in the time period between times $t_{24}$ and $t_{25}$. And finally the data modulation process is performed to the final page $P_3$ at a time $t_{26}$ by the microprocessor 4. Thus, data recording operation with respect to the sectors $S_0$-$S_3$ is completed (709).

The number of sectors which are not yet processed is calculated by subtracting the number of sectors completed in data recording operation from the data of the block counter designated by the device command signal 105. Then the number of the sectors which are not yet processed is compared with the capacity of the memory circuit 9 by the microprocessor 4. When the number of the sectors which are not yet processed is larger than the capacity (four sectors in the embodiment) of the memory circuit 9, the data processing unit is made to equal to the capacity of the memory circuit 9 (4 sectors). When the number of the sectors which are not yet processed is not larger than the capacity of the memory circuit 9, the data processing unit is formed by the number of the sectors which are not yet processed, and the process of Steps 711 and 712 are performed. Since the six sectors are set in the block count in the data recording operation in the embodiment, the data processing unit is formed by two sectors in the second operation after a time $t_{27}$ in FIG. 6 (Step 710).

The data transfer process with respect to each sector of the data processing unit is successively performed by microprocessor 4 (Step 711).

Subsequently, the error correction process and data modulation process are performed with respect to each sector of the data processing unit as follows: First, after carrying out the error correction process with respect to the start sector of the data processing unit, an error correction process and a data modulation process are performed parallelly with respect to other sectors of the data processing unit. Finally, data modulation process with respect to the final sector of the data processing unit is performed (Step 712).

Then the data of the block counter which is designated by the device command signal 105 is compared with the number of sectors which have been recorded, and thereby completion of recording process with respect to the entire sectors is determined. Thus the data recording operation with respect to the entire sectors are completed, and the command status signal 112 is transmitted to the host computer 3 from the microprocessor 4. On the other hand, in the event that the sectors which are not yet recorded remain, the flow returns to Step 710 and the data recording operation is performed with respect to the subsequent data processing unit (Step 713).

The data recording operation in the above-mentioned embodiment is applied to six sectors from sector $S_0$ to sector $S_5$ by using the memory circuit 9 which is memorizable four sectors of the recording data. In general, in the recording operation of the parallel mode with respect to the data which is larger than the capacity of the memory circuit 9, Step 704 is repeated. On the other hand, in the recording operation of the buffering mode, the data to be recorded is divided into a plurality of data processing units, and Steps 710–713 are repeated.

In the above-mentioned Step 701, the time interval wherein the data transfer busy signal 107 is at high level (busy status) is measured by using the timer mounted in the transfer time measuring circuit 12. In place of the Step 701, a data transfer time which is measured by the microprocessor 4 having a timer can be set in the transfer mode control circuit 13.

In the above-mentioned Step 702, the data demodulation time which is measured in the data reproduction operation is compared with the data transfer time with respect to the start sector, and thereby the operation mode is determined by the transfer mode control circuit 13. However, in the event that the data reproduction operation by the device command is not performed in advance (in the event that recording operation is first performed), the data MODEM time can be measured as described below. For example, according to Proposal Draft (DP10090) of the optical disk of 90 mm diameter which is issued by the ISO, a defect management area is allotted on a specific area of the optical disk. Then, disk control information such as DDS (Disk Definition Structure) in which substitution sectors, a defect list arrangement on the optical disk and the defect list itself are recorded in the defect management area of the disk. Since the disk control information is indispensable to perform the recording-reproducing operation of the data, when the optical disk is set on the drive unit 1, the disk control information is firstly read out and is stored in the information recording-reproducing apparatus. Therefore, the data demodulation time length is measured in the reproduction operation of the disk control information by the MODEM time measurement circuit 11.

As replacement for the above-mentioned method, the data demodulation time can be directly measured by the MODEM time measurement circuit 11 in the recording operation of the disk control information which is performed in the format processing.

The execution time of the data modulation process can be calculated from the format of a disk. Namely, a revolution time of one sector of the disk is calculated on the basis of the number of sector of one circular track and the rotation speed of the disk. Then, the revolution time of a data field is calculated by subtracting the revolution times of an ID field and gap areas from the revolution time for one sector. And the obtained revolution time of the data field can be used as the execution time of the data modulation process.

When the disk is set in the drive unit 1, the execution time of the data modulation process which is calculated as mentioned above is set in the timer of the transfer mode control circuit 13 as the data MODEM time. The timer is activated in synchronism with start of the data transfer operation and measures a transfer time. At completion of the time measurement by the timer, the status of the data transfer busy signal 107 is inspected by the transfer mode control circuit 13 and the operation mode is determined. The above-mentioned process is realizable by measuring the execution time of the data modulation process by the microprocessor 4 having the timer.

Furthermore, in a manner similar to that described in the reproduction operation, in the format in which the number of sectors per one track varies corresponding to the track address, such as in MCAV (Modified Constant Angular Velocity) format, the execution time of the data modulation process in the sector of a central zone of a disk is longer than that in the sector of the peripheral zone. In the information recording-reproducing apparatus using such a medium, when data recording operation extending over plural zones is commanded by the device command signal 105, the operation mode of the data transfer which is determined at first is changed during performing the command. Namely, the operation mode of the data transfer is determined anew at the start sector of other zone which is different in the length of the sector. After then, the data recording operation with respect to the sector of the zone is performed in compliance with the new determination.

In the above-mentioned control process, the execution time of the data modulation process is compared with the execution time of the data transfer process which is measured by the timer of the transfer mode control circuit 13, and the operation mode of the data transfer is determined. As replacement of the method mentioned above, the operation mode can be determined by direct comparison of the execution time of the data modulation process with the execution time of the data transfer process in a similar manner to the data reproduction operation.

Figure 8:
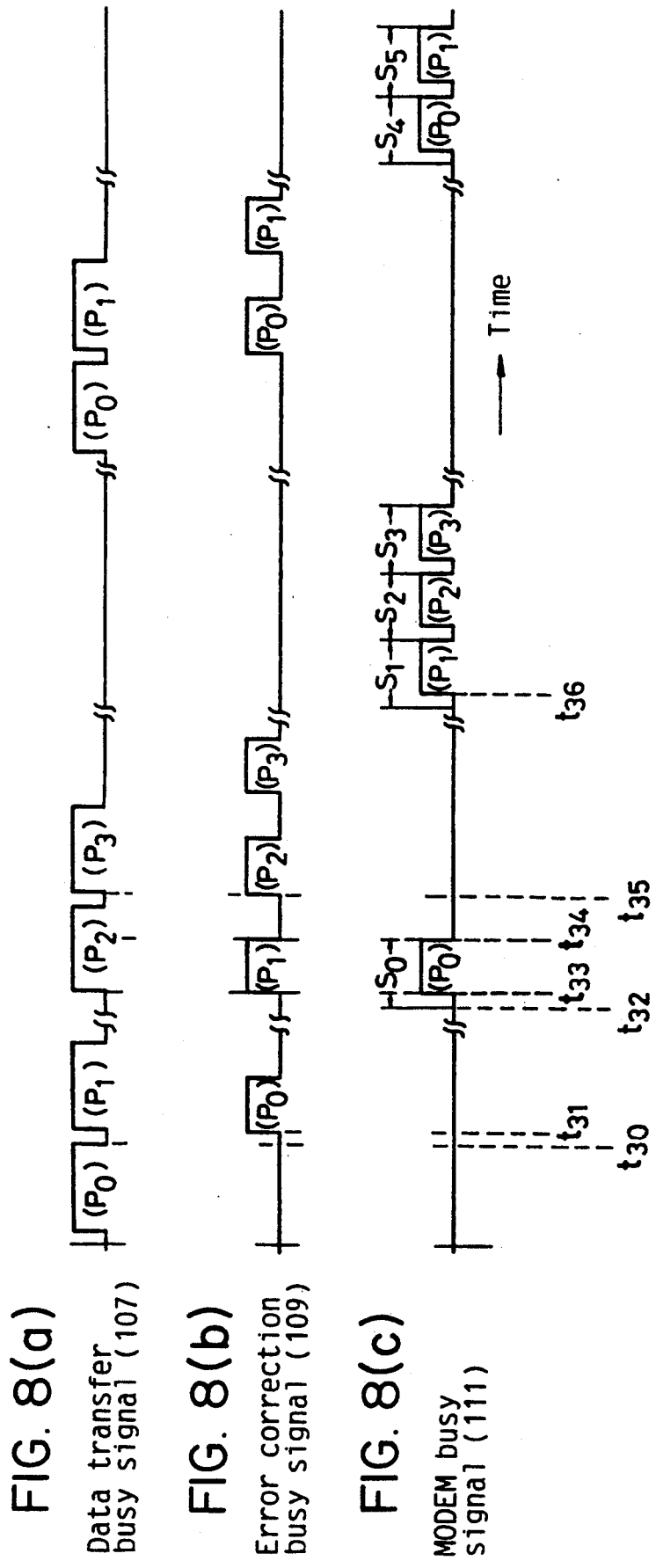
FIG. 8 (A, B and C) are time charts of the data recording operation in the buffering mode.
Figure 9:
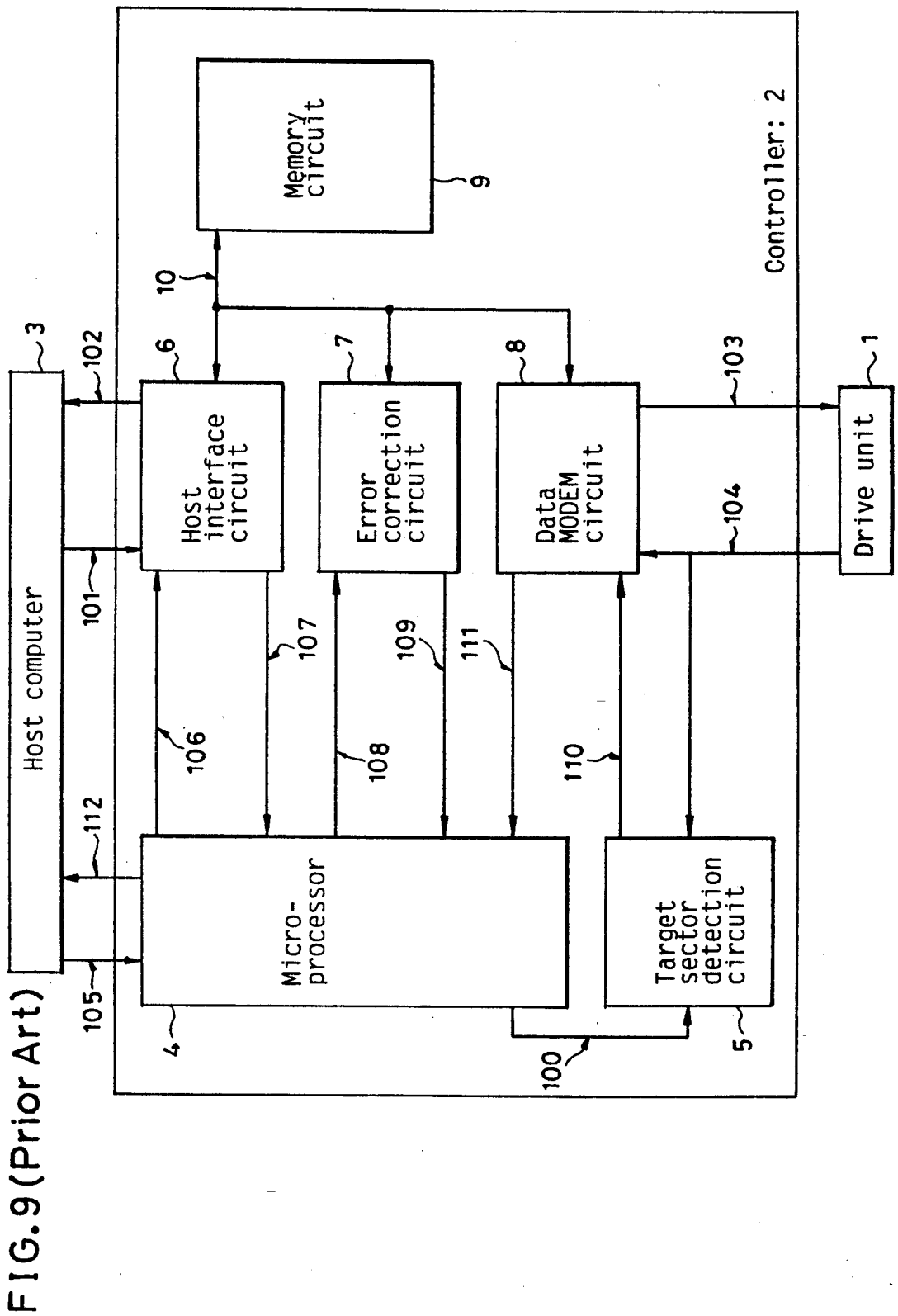
FIG. 9 is the circuit block diagram of the information recording-reproducing apparatus in the prior art.

Such data recording operation is also elucidated with reference to the timing charts shown in FIGS. 5 and 8. FIG. 5 is the timing chart of the data recording operation in parallel mode as mentioned above, and FIG. 8 is a timing chart of the data recording operation of the buffering mode utilizing the execution time of the data transfer process in the reproduction process. Referring to FIG. 8, the diagram (a) shows the status of the data transfer busy signal 107 which is transmitted from the host interface circuit 6, the diagram (b) shows the status of the error correction busy signal 109 which is transmitted from the error correction circuit 7, and the diagram (c) shows the status of the MODEM busy signal 111 which is transmitted from the data MODEM circuit 8.

After completion of the data transfer process with respect to the page $P_0$ at a time $t_{30}$, the error correction process with respect to the page $P_0$ and the data transfer process with respect to the page $P_1$ are performed at a time $t_{31}$ by the microprocessor 4. Subsequently, the start sector $S_0$ is detected at a time $t_{32}$. Then, data modulation process is started with respect to the page $P_0$ at a time $t_{33}$, and then the data transfer process with respect to the page $P_2$ and the error correction process with respect to the page $P_1$ are also performed in parallel. Moreover, after detection of completion of the data modulation process by the status of the MODEM busy signal 111 at a time $t_{34}$, the status of the data transfer busy signal 107 is detected by the transfer mode control circuit 13, and the transfer mode control signal 115 which corresponds to the status is transmitted. In the event that the data transfer busy signal 107 is not busy status as shown in FIG. 5, the transfer mode control signal 115 which is set in the parallel mode is transmitted to the microprocessor 4 by the transfer mode control circuit 13. After then, the data recording operation of the parallel mode is performed in compliance with the process after the Step 704.

On the other hand, in the event that the data transfer busy signal 107 is in busy status at a time $t_{34}$ as shown in FIG. 8, the transfer mode control signal 115 which sets the buffering mode is transmitted from the transfer mode control circuit 13. At that time, data transfer process with respect to the page $P_3$ and the error correction process with respect to the page $P_2$ are performed in parallel after completion of the transfer process of the page $P_2$ at a time $t_{35}$. Subsequently, the data modulation process with respect to the pages $P_1$, $P_2$ and $P_3$ are started at a time $t_{36}$ after completion of the error correction process of the pages $P_2$ and $P_3$. Moreover, the data recording operation of the successive sectors are performed in compliance with the steps following the Step 710 by the microprocessor 4. In the above-mentioned process, the operation mode can be determined by inspecting the status of the busy signal by the firmware which is stored in the microprocessor 4.

While the invention has been particularly shown and described with reference to several preferred embodiments thereof, it will be understood by those skilled in the art that various changes in form and detail may be made therein without departing from the true spirit and scope of the invention as defined by the appended claims.

What is claimed is:

1. An information recording-reproducing apparatus for optimizing data transfer between a host computer and an information recording medium, said apparatus comprising:
   a data MODEM circuit for performing a modulation-demodulation operation, said data MODEM circuit modulating data to be recorded on said information recording medium and demodulating data reproduced from said information recording medium, said data MODEM circuit generating a MODEM busy signal during said modulation-demodulation operation;
   memory means for storing said data to be recorded and said data reproduced;
   a host interface means for controlling a data transfer operation between said host computer and said apparatus, said host interface means generating a data transfer busy signal during a data transfer operation; and
   a transfer mode control means for selecting the optimal data transfer operation mode for transferring data between said host computer and said information recording medium, said transfer mode control means determining which one of a duration of said modulation-demodulation operation and a duration of said data transfer operation is longer based on said MODEM busy signal and said data transfer busy signal, said transfer mode control means selecting a parallel mode in which said modulation-demodulation operation and said data transfer operation are performed in parallel when a duration of said modulation-demodulation operation is longer than a duration of said data transfer operation, said transfer mode control means selecting a buffering mode in which said modulation-demodulation operation and said data transfer operation are performed sequentially when a duration of said data transfer operation is longer than a duration of said modulation-demodulation operation.

2. An apparatus according to claim 1, wherein said transfer mode control means comprises a timer for measuring a duration of said MODEM busy signal to determine said duration of said modulation-demodulation operation.

3. An information recording-reproducing apparatus for optimizing data transfer between a host computer and an information recording medium, said apparatus comprising:
   a data MODEM circuit for performing a modulation-demodulation operation, said data MODEM circuit modulating data to be recorded on said information recording medium and demodulating data reproduced from said information recording medium, said data MODEM circuit generating a MODEM busy signal during said modulation-demodulation operation;
   memory means for storing said data to be recorded and said data reproduced;
   a host interface means for controlling a data transfer operation between said host computer and said apparatus, said host interface means generating a data transfer busy signal during a data transfer operation;
   MODEM time measurement means for measuring an execution time of said modulation-demodulation operation based on said MODEM busy signal;

transfer time measurement means for measuring an execution time of said data transfer operation based on said data transfer busy signal; and a transfer mode control means for selecting the optimal data transfer operation mode for transferring data between said host computer and said information recording medium, said transfer mode control means selecting a parallel mode in which said modulation-demodulation operation and said data transfer operation are performed in parallel when an execution time of said modulation-demodulation operation is longer than an execution time of said data transfer operation, said transfer mode control means selecting a buffering mode in which said modulation-demodulation operation and said data transfer operation are performed sequentially when an execution time of said data transfer operation is longer than an execution time of said modulation-demodulation operation.

4. An apparatus according to claim 3, wherein said information recording medium is organized into sectors;

said transfer mode control means changes said data transfer operation mode to said parallel mode when an execution time of said moulation-demodulation operation for a start sector of said information recording medium is longer than an execution time of said data transfer operation, said start sector being defined as a first sector in a group of sectors subject to said modulation-demodulation operation; and said transfer mode control means changes said data transfer operation mode to said buffering mode when an execution time of said data transfer operation is longer than an execution time of said modulation-demodulation operation for a start sector.

5. An apparatus according to claim 3, wherein said information recording medium is of a MCAV format in which said information recording medium is divided into zones of sectors;

said transfer mode control means changes said data transfer operation mode to said parallel mode when an execution time of said modulation-demodulation operation for a start sector of a zone in said information recording medium is longer than an execution time of said data transfer operation, said start sector of a zone being defined as a first sector in a group of sectors in a zone which is subjected to said modulation-demodulation operation; and said transfer mode control means changes said data transfer operation mode to said buffering mode when an execution time of said data transfer operation is longer than an execution time of said modulation-demodulation operation for a start sector in a zone.

6. A apparatus according to claim 3, wherein said transfer mode control means commprises a microcomputer.

7. An apparatus according to claim 3, wherein said MODEM time measurement means measures as said duration of said modulation-demodulation operation, time elapsed in transferring information recording medium control information data between said information recording medium and said apparatus.

8. An apparatus according to claim 3, wherein said duration of said modulation-demodulation operation represents the duration required for a detecting head to trace a data field in a sector of said information recording medium.

* * * * *